(12) United States Patent
Nakagawa et al.

(10) Patent No.: US 12,567,228 B2
(45) Date of Patent: Mar. 3, 2026

(54) IMAGE DATA PROCESSING METHOD, IMAGE DATA PROCESSING APPARATUS, AND COMMERCIAL USE

(71) Applicant: TOSYO, Inc., Saitama (JP)

(72) Inventors: Takafumi Nakagawa, Saitama (JP); Souichiro Ito, Saitama (JP)

(73) Assignee: TOSYO, Inc., Saitama (JP)

( * ) Notice: Subject to any disclaimer, the term of this patent is extended or adjusted under 35 U.S.C. 154(b) by 452 days.

(21) Appl. No.: 18/014,172

(22) PCT Filed: Jul. 8, 2020

(86) PCT No.: PCT/JP2020/026724
§ 371 (c)(1),
(2) Date: Jan. 3, 2023

(87) PCT Pub. No.: WO2022/009341
PCT Pub. Date: Jan. 13, 2022

(65) Prior Publication Data
US 2023/0298304 A1     Sep. 21, 2023

(51) Int. Cl.
*G06V 10/60* (2022.01)
*G06Q 30/0601* (2023.01)
(Continued)

(52) U.S. Cl.
CPC .............. *G06V 10/60* (2022.01); *G06Q 50/04* (2013.01); *G06T 5/70* (2024.01); *G06T 5/73* (2024.01);
(Continued)

(58) Field of Classification Search
CPC .......... G06V 10/60; G06V 10/25; G06T 5/70; G06T 5/73; G06T 2207/10024;
(Continued)

(56) References Cited

U.S. PATENT DOCUMENTS

| | | | |
|---|---|---|---|
| 10,366,175 B2 | 7/2019 | Gupta et al. | |
| 2008/0252651 A1* | 10/2008 | Mills | G06T 11/001 |
| | | | 345/581 |
| 2015/0066189 A1* | 3/2015 | Mulligan | G06Q 30/0621 |
| | | | 700/136 |

FOREIGN PATENT DOCUMENTS

| | | |
|---|---|---|
| CN | 108932404 | 12/2018 |
| JP | 2001314677 | 11/2001 |

(Continued)

OTHER PUBLICATIONS

"Search Report of Europe Counterpart Application", issued on Dec. 5, 2023, pp. 1-11.

(Continued)

*Primary Examiner* — Emily C Terrell
*Assistant Examiner* — Daniella M. DiGuglielmo
(74) *Attorney, Agent, or Firm* — JCIPRNET

(57)     ABSTRACT

An image data processing apparatus and an image data processing method for generating Provided is a sample image that is close to an actual object are introduced. The image data processing method is configured to perform the following steps 1 to 5. (Step 1) Image data (A0) corresponding to an image (A) is converted to acquire image data (A1). (Step 2) Image data (B0) corresponding to an article (B) is converted to acquire image data (B1) corresponding to a surface state of a region of the article (B) on which the image (A) is printed. (Step 3) Image data (A2) is acquired from the image data (A1) and the image data (B1). (Step 4) The image data (A2) is converted to acquire image data (A3). (Step 5) Image data (C0) corresponding to a product (C) is acquired from the image data (A3) and the image data (B0).

22 Claims, 5 Drawing Sheets

(51) Int. Cl.

| | | |
|---|---|---|
| *G06Q 50/04* | (2012.01) | |
| *G06T 5/70* | (2024.01) | |
| *G06T 5/73* | (2024.01) | |
| *G06T 11/60* | (2006.01) | |
| *G06V 10/25* | (2022.01) | |
| *H04N 1/40* | (2006.01) | |

(52) U.S. Cl.

CPC .............. *G06T 11/60* (2013.01); *G06V 10/25* (2022.01); *H04N 1/40012* (2013.01); *G06Q 30/0621* (2013.01); *G06T 2207/10024* (2013.01)

(58) Field of Classification Search

CPC .... G06T 11/60; H04N 1/40012; G06Q 50/04; G06Q 30/0621

See application file for complete search history.

(56) References Cited

FOREIGN PATENT DOCUMENTS

| | | | |
|---|---|---|---|
| JP | 2002133201 | | 5/2002 |
| JP | 2003162644 | | 6/2003 |
| JP | 2006252402 | | 9/2006 |
| JP | 2009239486 | | 10/2009 |
| JP | 2009239486 A | * | 10/2009 |
| JP | 2013511093 | | 3/2013 |
| JP | 2019102018 | | 6/2019 |
| JP | 2020077252 | | 5/2020 |
| JP | 2020087457 | | 6/2020 |

OTHER PUBLICATIONS

"Office Action of Taiwan Counterpart Application", issued on Jan. 8, 2025, with English translation thereof, p. 1-p. 19.

"International Search Report (Form PCT/ISA/210) of PCT/JP2020/026724," mailed on Oct. 13, 2020, with English translation thereof, pp. 1-4.

Office Action of European Counterpart Application, issued on Jun. 10, 2024, pp. 1-5.

\* cited by examiner 100                    101

IMAGE DATA PROCESSING METHOD, IMAGE DATA PROCESSING APPARATUS, AND COMMERCIAL USE

CROSS-REFERENCE TO RELATED APPLICATION

This application is a 371 application of the International PCT application serial no. PCT/JP2020/026724, filed on Jul. 8, 2020. The entirety of the above-mentioned patent application is hereby incorporated by reference herein and made a part of this specification.

TECHNICAL FIELD

The present invention relates to an image data processing method, an image data processing apparatus, and a commercial use. More particularly, the present invention relates to ordering and manufacturing of a product in which an item is printed, and a method and an apparatus for generating an image of a product to be ordered and manufactured into a state closer to an actual object.

BACKGROUND ART

Methods for manufacturing and selling products in which a design and text designated by a purchaser are printed on an item such as clothing, household goods, and stationery with general-purpose images are already widespread. For example, manufacturing and selling systems described in PTLs 1 to 5 below are known.

PTL 1 describes a product selling system for individually manufacturing and selling a custom-made product in which an image published in a book is printed on a desired material.

In a clothing manufacturing system described in PTL 2, a printer receives a color/pattern printing signal corresponding to a color and a pattern selected by a customer from a management computer for each order and prints the color and the pattern on each fabric (original fabric).

In an embroidery system described in PTL 3, a user selects a garment through the Internet, specifies embroidery locations on the garment, and selects an embroidery pattern. An embroidery simulation is imaged in three dimensions. An embroidery pattern control signal is provided over the Internet to a remote embroidery machine, which can automatically embroider the embroidery pattern specified by the user and customized onto an actual garment.

In a made-to-order system for clothing in a retail facility described in PTL 4, a customer selects a figure from a catalog, a computer transmits a printing instruction related to the figure selected by the customer to a printer, and the printer applies colorants to a cloth based on the printing instruction to reproduce the selected figure on the cloth.

PTL 5 describes an umbrella order processing method in which a customer can order an original one-piece umbrella online by designating an image for umbrella fabric.

With these technologies in the related art, even if customers, stores, and manufacturing facilities are far away, by using the Internet and various terminal devices, it is possible to manufacture a wide variety of products in small quantities that meet the needs of individual customers while minimizing the loss of raw materials. Such a made-to-order system is welcomed by customers because the system allows the customers to select products from a wide variety of candidates anytime, anywhere.

However, in such a made-to-order system, in many cases, a customer designates an image from images or printed matter and makes an order without seeing an actual product. In order systems using the Internet, it is generally possible to adjust and confirm a size and an arrangement of an image pattern designated by a customer. However, it is difficult to find detailed information on a finished product, such as texture and feel of cloth products or knits, from an image provided for such adjustment and confirmation. There is a large or small difference between the product state that can be visually recognized with the image or printed matter provided to the customer and the actual finished product. This difference is also affected by an image device used by the customer, customer's psychology (magnitude of imagination and expectations), and the like. For this reason, in some cases, the difference between the product imagined at the time of ordering and the product received exceeds the customer's tolerance, causing customer dissatisfaction.

CITATION LIST

Patent Literature

[PTL 1] Japanese Unexamined Patent Application Publication No. 2003-162644
[PTL 2] Japanese Unexamined Patent Application Publication No. 2006-252402
[PTL 3] Japanese Unexamined Patent Application Publication No. 2001-314677
[PTL 4] PCT Japanese Translation Patent Publication No. 2013-511093
[PTL 5] Japanese Unexamined Patent Application Publication No. 2020-77252

In particular, a made-to-order T-shirt, in which a design designated by a customer is printed on shirt fabric, is very popular at schools, companies, events, and the like, and is attractive to consumers because of easy ordering using the Internet. However, such a made-to-order T-shirt uses a relatively large-size design that is trendy, has strong messages, and has strong image characteristics, and customers often strongly demand that desired design be reproduced on an actual product. Such made-to-order products with high customer expectations are more likely to cause customer dissatisfaction with finished products.

SUMMARY OF INVENTION

Technical Problem

Therefore, the present inventor aimed to eliminate the above-mentioned customer dissatisfaction in the made-to-order system using the Internet. That is, the present inventor sought means by which a customer can more accurately image an actual object when a made-to-order product is manufactured by printing a design designated by the customer on an item such as clothing.

Solution to Problem

As a result, the present inventor succeeded in, when a customer designates a design for a made-to-order product, converting and imaging image data of the design designated by the customer into image data that is close to a state in which the image data of the design is printed on an item such as clothing. That is, the present invention is as follows.

(Invention 1) An image data processing method for performing the following steps 1 to 5 for handling a product (C) in which a specific image (A) is applied to a specific article (B), the method including:

(step 1) a step of converting image data (A0) corresponding to the image (A) to acquire image data (A1);

(step 2) a step of converting image data (B0) corresponding to the article (B) to acquire image data (B1) corresponding to a surface state of a region of the article (B) on which the image (A) is printed;

(step 3) a step of acquiring image data (A2) from the image data (A1) and the image data (B1);

(step 4) a step of converting the image data (A2) to acquire image data (A3); and (step 5) a step of acquiring image data (C0) corresponding to the product (C) from the image data (A3) and the image data (B0).

(Invention 2) The image data processing method according to Invention 1, in which, in the step 1, a value corresponding to one or more of hue, brightness, chroma, transparency, and sharpness of the image data (A0) corresponding to the image (A) is converted to acquire the image data (A1).

(Invention 3) The image data processing method according to Invention 1, in which, in the step 1, a value corresponding to one or more of brightness, chroma, and transparency of the image data (A0) corresponding to the image (A) is converted so as to reduce one or more of brightness, chroma, and transparency, thereby acquiring the image data (A1).

(Invention 4) The image data processing method according to Invention 1, in which, in the step 2, the image data (B0) corresponding to the article (B) is converted to acquire the image data (B1) corresponding to unevenness and/or texture of a region of the article (B) to which the image (A) is applied.

(Invention 5) The image data processing method according to Invention 1, in which the article (B) is clothing, and in the step 2, color image data included in the image data (B0) corresponding to the article (B) is converted into grayscale image data and/or the image data (B0) is subjected to blurring to acquire the image data (B1) corresponding to unevenness and/or texture of the region of the article (B) on which the image (A) is printed.

(Invention 6) The image data processing method according to Invention 1, in which, in the step 3, the image data (A2) that reflects both the image (A) and a surface state of a region of the article (B) to which the image (A) is applied is acquired from the image data (A1) and the image data (B1).

(Invention 7) The image data processing method according to Invention 1, in which, in the step 3, the image data (A2) that reflects both the image (A) and the region of the article (B) on which the image (A) is printed is acquired from the image data (A1) and the image data (B1).

(Invention 8) The image data processing method according to Invention 1, in which, in the step 4, a value corresponding to one or more of hue, brightness, chroma, transparency, and sharpness of the image data (A2) is converted to acquire the image data (A3).

(Invention 9) The image data processing method according to Invention 1, in which, in the step 4, a value corresponding to one or more of hue, brightness, chroma, transparency, and sharpness of the image data (A2) is converted so as to increase one or more of brightness, chroma, transparency, and sharpness, thereby acquiring the image data (A3).

(Invention 10) The image data processing method according to Invention 1, in which, in the step 5, the image data (C0) as a sample image of a made-to-order product obtained by applying the image (A) to the article (B) is acquired from the image data (A3) and the image data (B0).

(Invention 11) The image data processing method according to Invention 1, in which the article (B) is clothing, and in the step 5, the image data (C0) as a sample image of made-to-order clothing obtained by printing the image (A) on the article (B) is acquired from the image data (A3) and the image data (B0).

(Invention 12) An image data processing apparatus having the following devices 1 to 5 for handling a product (C) in which a specific image (A) is applied to a specific article (B), the apparatus including:

(device 1) a device converting image data (A0) corresponding to the image (A) to acquire image data (A1);

(device 2) a device converting image data (B0) corresponding to the article (B) to acquire image data (B1) corresponding to a surface state of a region of the article (B) on which the image (A) is printed;

(device 3) a device acquiring image data (A2) from the image data (A1) and the image data (B1);

(device 4) a device converting the image data (A2) to acquire image data (A3); and (device 5) a device acquiring image data (C0) corresponding to the product (C) from the image data (A3) and the image data (B0).

(Invention 13) The image data processing apparatus according to Invention 12, in which the device 1 converts a value corresponding to one or more of hue, brightness, chroma, transparency, and sharpness of the image data (A0) corresponding to the image (A) to acquire the image data (A1).

(Invention 14) The image data processing apparatus according to Invention 12, in which the device 1 converts a value corresponding to one or more of brightness, chroma, and transparency of the image data (A0) corresponding to the image (A) so as to reduce one or more of brightness, chroma, and transparency, thereby acquiring the image data (A1).

(Invention 15) The image data processing apparatus according to Invention 12, in which the device 2 converts the image data (B0) corresponding to the article (B) to acquire the image data (B1) corresponding to unevenness and/or texture of a region of the article (B) to which the image (A) is applied.

(Invention 16) The image data processing apparatus according to Invention 12, in which the article (B) is clothing, and the device 2 converts color image data included in the image data (B0) corresponding to the article (B) into grayscale image data and/or performs blurring on the image data (B0) to acquire the image data (B1) corresponding to unevenness and/or texture of the region of the article (B) on which the image (A) is printed.

(Invention 17) The image data processing apparatus according to Invention 12, in which the device 3 acquires the image data (A2) that reflects both the image (A) and a surface state of a region of the article (B) to which the image (A) is applied, from the image data (A1) and the image data (B1).

(Invention 18) The image data processing apparatus according to Invention 12, in which the device 3 acquires the image data (A2) that reflects both the image (A) and the region of the article (B) on which the image (A) is printed, from the image data (A1) and the image data (B1).

(Invention 19) The image data processing apparatus according to Invention 12, in which the device 4 converts a value corresponding to one or more of hue, brightness, chroma, transparency, and sharpness of the image data (A2) to acquire the image data (A3).

(Invention 20) The image data processing apparatus according to Invention 12, in which the device 4 converts a value corresponding to one or more of hue, brightness, chroma, transparency, and sharpness of the image data (A2) so as to increase one or more of brightness, chroma, transparency, and sharpness, thereby acquiring the image data (A3).

(Invention 21) The image data processing apparatus according to Invention 12, in which the device 5 acquires the image data (C0) as a sample image of a made-to-order product obtained by applying the image (A) to the article (B), from the image data (A3) and the image data (B0).

(Invention 22) The image data processing apparatus according to Invention 12, in which the article (B) is clothing, and the device 5 acquires the image data (C0) as a sample image of made-to-order clothing obtained by printing the image (A) on the article (B), from the image data (A3) and the image data (B0).

(Invention 23) A commercial use of a product (C) in which a specific image (A) is applied to a specific article (B) using the image data processing method according to Invention 1.

(Invention 24) A commercial use of a product (C) in which a specific image (A) is applied to a specific article (B) using the image data processing-method apparatus according to Invention 12.

An image generated from the image data (C) acquired by the present invention reproduces an actual state of the product (C) to a high degree. Therefore, using the image data (C0), a sample image of the product (C) obtained by actually applying the image (A) to the article (B) by a method such as printing, pasting, or projecting can be provided.

DESCRIPTION OF EMBODIMENTS

Figure 1:
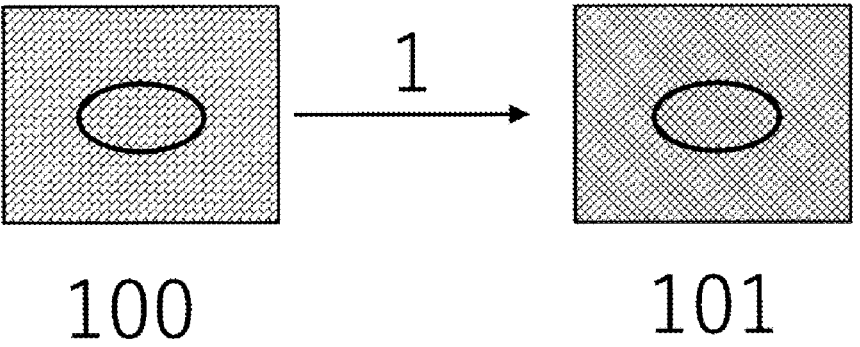
FIG. 1 is an image diagram for visually understanding processing 1 and image data conversion performed by a device 1 of the present invention.

[Image (A), Article (B), and Product (C)]

The present invention relates to an image data processing method, an image data processing apparatus, and an image display device for handling a product (C) in which a specific image (A) is applied to a specific article (B). The specific image (A) is any visible object that can be visually evaluated and identified and has design and information properties. Examples thereof include paintings, photographs, books, printed materials thereof, and digital data thereof displayed on mobile terminals such as PCs and smartphones are included. The specific article (B) is any medium having a surface on which the image (A) can be printed directly or indirectly.

In the case of direct printing, so-called digital printing is performed. Specifically, image data based on image (A) is transmitted to a printer as printing data via the Internet, an intranet communication, or an electronic medium, and the printer controls an output of a colorant such as ink using the received printing data and performs printing corresponding to the desired image (A) on the surface of the article (B). In the case of indirect printing, image data based on the image (A) is transmitted to a printer as printing data via the Internet, an intranet communication, or an electronic medium, and the printer controls an output of a colorant such as ink using the received printing data, performs printing corresponding to the desired image (A) on a laminate base material such as a film or sheet, and allows the resulting printed sheet or film to adhere to the surface of the article (B) with or without an adhesive. The article (B) is, for example, paper, cloth, fiber, plastic, wood, glass, ceramic, or a composite of two or more materials selected therefrom.

The product (C) is, for example, a made-to-order product (C) such as garments, shoes, daily necessities, miscellaneous goods, and stationery. Such a made-to-order product is generally reproduced by printing an image in a terminal device or an image selected by a customer from samples on a surface of a general-purpose medium such as garments, shoes, daily necessities, miscellaneous goods, and stationery selected by the customer. The product (C) using the present invention is preferably a made-to-order product (C) in which a desired design (A) is printed on daily necessities or miscellaneous goods (B) made of cloth, and more preferably clothing such as a T-shirt on which a design selected by a customer is printed. When the article (B) made of cloth is used, in many cases, a sample having the design (A) looks different from the design of the made-to-order product (C) that is actually produced. It is difficult for the customer to predict an actual finished made-to-order product (C). Therefore, the image data processing method and the image data processing apparatus of the present invention aim to generate an image of the product (C) that is close to an actual object before printing.

[Image Data Processing Method/Image Data Processing]

In the present invention, starting from image data (A0) corresponding to the image (A) selected in advance and image data (B0) of the article selected in advance, conversion is performed by devices 1 to 5 performing the following steps 1 to 5 to acquire image data (C0) that generates an image of the product (C) close to an actual object.

[Step 1]

Typically, when the image (A) is printed on a certain medium, vividness and transparency of the original image (A) are slightly lost depending on printing conditions and a usage environment. Therefore, in the present invention, first, in step 1, image data (A1) is caused to approximate a state of the printed image (A).

In step 1, image data (A0) corresponding to the image (A) is converted to obtain image data (A1). Specifically, in step 1, a value corresponding to one or more of hue, brightness, chroma, transparency, and sharpness of the image data (A0) corresponding to the image (A) is converted to acquire the Image data (A1). Variables to be converted and the amount of conversion are appropriately set according to characteristics of the image (A) and the type of the article (B). In a case where the article (B) is made of, for example, paper, cloth, or wood and a shade of the image (A) is reproduced cloudy or dark on the actual product (C), in step 1, a value corresponding to one or more of brightness, chroma, and transparency of the image data (A0) corresponding to the image (A) is converted so as to reduce one or more of brightness, chroma, transparency, and sharpness, thereby acquiring the image data (A1). Conversely, in a case where the article (B) is made of, for example, plastic or glass and the shade of the image (A) is reproduced transparently and brightly on the actual product (C), in step 1, a value corresponding to one or more of brightness, chroma, and transparency of the image data (A0) corresponding to the image (A) is converted so as to increase one or more of brightness, chroma, transparency, and sharpness, thereby acquiring the image data (A1). The conversion in step 1 is appropriately defined according to the combination of the image (A) and the article (B).

In a case where the article (B) is a made-to-order T-shirt, in step 1, a value corresponding to one or more of brightness, chroma, and transparency of the image data (A0) corresponding to the image (A) is converted so as to preferably reduce one or more of brightness, chroma, and transparency or the original image (A) to 80% or less, and more preferably reduce one or more of brightness, chroma, and transparency or the original image (A) to 75% or less, thereby acquiring the image data (A1).

The device 1 that performs step 1 generally has a database, an image data (A0) output unit, a data conversion unit, an image data (A1) output unit, a memory, and a transmission unit. The database stores image data (A0) corresponding to selectable images (A). Based on a signal corresponding to the image (A) input to the image data processing apparatus of the present invention, the data conversion unit of the device 1 extracts the requested image data (A0) from the database, and converts the image data (A0) according to predetermined conditions to generate image data (A1). The generated image data (A1) is transmitted to the device 3 that performs step 3, which will be described later.

FIG. 1 is an image diagram for understanding step 1 and the device 1. FIG. 1 corresponds to a case where the values of brightness, chroma, and transparency of the image data (A0) are converted in step 1 and the device 1 so as to reduce one or more of brightness, chroma, and transparency, thereby generating the image data (A1). In the present invention, it is not necessary to actually display an image (101) generated by the image data (A1). However, for convenience, FIG. 1 schematically shows an image (A) (100) and the image (101) generated by the image data (A1). When the image (101) and the image (A) (100) are compared to each other, the image (101) appears to have a slightly darker and muddy shade compared to the image (A) (100).

[Step 2]

Step 2 is a necessary step for reflecting an appearance of the actual product (C) in the image data (A1) acquired in step 1.

In step 2, the image data (B0) corresponding to the article (B) is converted to acquire image data (B1) corresponding to a surface state of a region of the article (B) on which the image (A) is printed. Specifically, in step 2, the image data (B0) corresponding to the article (B) is converted to acquire the image data (B1) corresponding to unevenness and/or texture of a region of the article (B) to which the image (A) is applied. In a case where the article (B) is made of a flexible material such as paper or cloth, or a material having a low glossiness such as wood or ceramic, in step 2, typically, color image data included in the image data (B0) corresponding to the article (B) is converted into grayscale image data and/or the image data (B0) is subjected to blurring to acquire the image data (B1) corresponding to unevenness and/or texture of the region of the article (B) on which the image (A) is printed. By using both the conversion to grayscale image data and the blurring, flexibility, degree of matte, moistness, and the like of the surface of the article (B) can be reflected in the image data (B1). Methods of the conversion to grayscale image data and the blurring are appropriately defined according to the material and shape of the article (B).

The device 2 that performs step 2 generally has a database, an image data (B0) output unit, a data conversion unit, an image data (B1) output unit, a memory, and a transmission unit. The database stores the image data (B0). The image data (B0) includes color image data corresponding to a color tone of the article (B). The color image data includes a value corresponding to a protruding portion (convex portion that looks bright) on the surface of the article (B) and a value corresponding to a recessed portion (concave portion that looks dark) on the surface of the article (B). Generally, in the image data (B0), R, G, and B values are allocated to one pixel as the color image data.

A distribution of color image data corresponding to the entire region of the article (B) is generated to correspond to wrinkles and roughness of the actual article (B). Based on the signal corresponding to the image (A) input to the image data processing apparatus of the present invention, the data conversion unit of the device 2 extracts a data set corresponding to a region of the article (B) in which the image (A) is arranged from the image data (B0), and converts color image data included in the data set into grayscale image data according to predetermined conditions. Generally, R, G, and B values included in the color image data are converted into one grayscale value. A conversion method and a correction method belonging to the conversion are appropriately defined according to the characteristics of the image (B). Typically, grayscale data corresponding to the protruding portion (convex portion that looks bright) on the surface of the article (B) is closer to a white value, and grayscale data corresponding to the recessed portion (concave portion that looks dark) on the surface of the article (B) is closer to a black value. In this manner, image data (B1) including the grayscale image data is generated.

The data conversion unit can further perform blurring on the data set corresponding to the region of the article (B) in which the image (A) is disposed. By performing both the conversion to grayscale image data and the blurring, the grayscale data closer to the white value and the grayscale data closer to the black value included in the image data (B1) to be generated are adjusted to correspond to a state in which the protruding portion (convex portion that looks bright) and the recessed portion (concave portion that looks dark) on the surface of the article (B) are smoothly continuous and achieve a fine distribution.

The image data (B1) subjected to the blurring is suitable in a case where the article (B) is made of a relatively thin fabric, for example, a T-shirt. By using both the grayscale image data and the blurring, fine unevenness, slopes, and smoothness found in T-shirt fabric and the texture of the fabric that these bring can be reflected in the image data (B1). In step 2 and the device 2 of the present invention, the generated image data (A1) is transmitted to the device 3, which will be described later.

Figure 2:
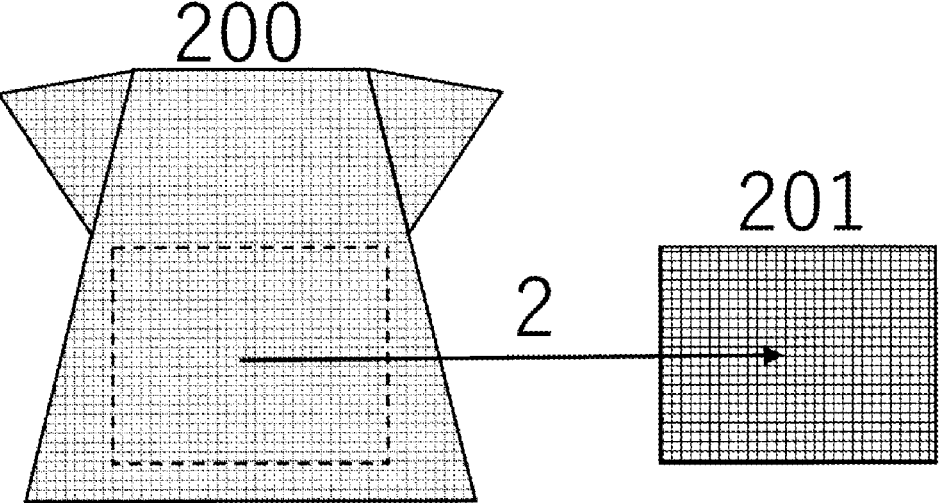
FIG. 2 is an image diagram for visually understanding processing 2 and image data conversion performed by a device 2 of the present invention.

FIG. 2 is an image diagram for understanding step 2 and the device 2. FIG. 2 corresponds to a case where the color image data included in the image data (B0) corresponding to the article (B) is converted into grayscale image data and subjected to blurring in step 2 and the device 2. In the present invention, it is not necessary to actually display an image (201) generated by the image data (B1). However, for convenience, FIG. 2 schematically shows an image (200) generated by the image data (B0) of the article (B) and the image (201) generated by the image data (B1). The image (200) corresponds to colors of the article (B), while the image (201) is limited to the region of the selected image (A) and is a black and white image.

[Step 3]

Step 3 corresponds to a first synthesizing step of an image corresponding to the image (A) and an image corresponding to the article (B).

In step 3, image data (A2) is acquired from the image data (A1) and the image data (B1). That is, in step 3, the image data (A2) that reflects both the image (A) and the surface state of the region of the article (B) to which the image (A) is applied is acquired from the image data (A1) and the image data (B1). In a case where a product (C) in which an image (A) is printed on an article (B) is requested, in step 3, the image data (A2) that reflects both the image (A) and the surface state of the region of the article (B) on which the image (A) is printed is acquired from the image data (A1) and the image data (B1).

The device 3 that performs step 3 generally has a data conversion unit, an image data (A1) and image data (B1) output unit, an image data (A2) output unit, a memory, and a transmission unit. The memory stores the image data (A1) and the image data (B1). The data conversion unit of the device 3 synthesizes the output image data (A1) and the image data (B1) by a predetermined program to generate the image data (A2). The acquired image data (A2) is transmitted to the device 4, which will be described later.

Figure 3:
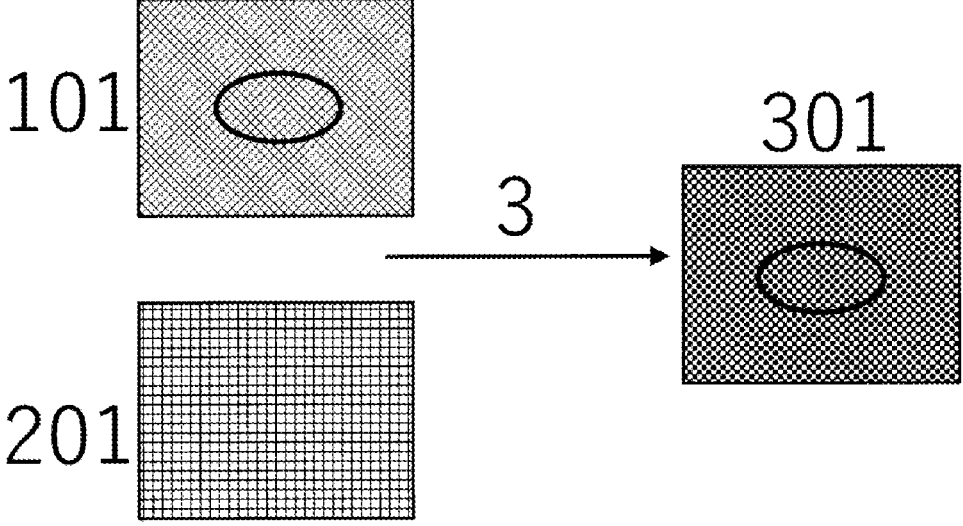
FIG. 3 is an image diagram for visually understanding processing 3 and image data conversion performed by a device 3 of the present invention.

FIG. 3 is an image diagram for understanding step 3 and device 3. FIG. 3 corresponds to a case where the image data (A2) that reflects both the image (A) and the surface state of the region of the article (B) on which the image (A) is printed is acquired from the image data (A1) and the image data (B1) in step 3 and the device 3. In the present invention, it is not necessary to actually display an image generated by the image data (A2). However, for convenience, FIG. 3 schematically shows the image (101) generated by the image data (A1), the image (201) generated by the image data (B1), and an image (301) generated by the image data (A2). In the image (301), colors of the image (101) and black and white/gray of the image (201) can be visually recognized.

[Step 4]

Step 4 corresponds to a step of correcting the image data (A2) obtained in step 3. In a case where color image data is converted into grayscale data, generally, data values of colors that actually look vivid or bright may be converted to data values corresponding to black or dark gray. Therefore, the grayscale data generated in step 2 does not necessarily completely match brightness and darkness that can be visually recognized on the article (B).

Therefore, in step 4 of the present invention, the image data (A2) is converted to acquire image data (A3). Specifically, in step 4, a value corresponding to one or more of hue, brightness, chroma, transparency, and sharpness of the image data (A2) is converted to acquire the image data (A3). For example, in step 4, a value corresponding to one or more of hue, brightness, chroma, transparency, and sharpness of the image data (A2) is converted so as to increase one or more of brightness, chroma, transparency, and sharpness, thereby acquiring the image data (A3).

The device 4 that performs step 4 generally has a data conversion unit, an image data (A2) output unit, an image data (A3) output unit, a memory, and a transmission unit. The data conversion unit of the device 4 converts the output image data (A2) using a predetermined program to generate the image data (A3). The acquired image data (A3) is transmitted to the device 5, which will be described later.

Figure 4:
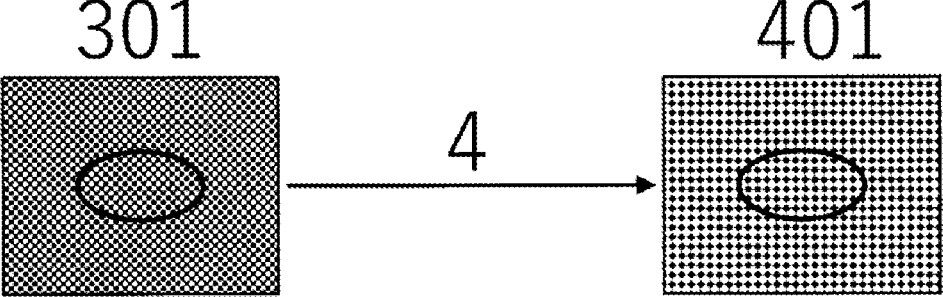
FIG. 4 is an image diagram for visually understanding processing 4 and image data conversion performed by a device 4 of the present invention.

FIG. 4 is an image diagram for understanding step 4 and the device 4. FIG. 4 corresponds to a case where a value corresponding to brightness and chroma of the image data (A2) is converted to increase brightness and chroma in step 4 and the device 4, thereby generating the image data (A3). In the present invention, it is not necessary to actually display an image (401) generated by the image data (A3). However, for convenience, FIG. 4 schematically shows the image (301) generated by the image data (A2), and the image (401) generated by the image data (A3). The image (401) will appear brighter and more vivid than the image (301). However, a stereoscopic effect observed in the image (301) is also maintained in the image (401). The image (401) reproduces the appearance of the image (A) in the state in which the image (A) is applied (typically printed) onto the article (B).

[Step 5]

Step 5 is a step for generating an image for predicting the product (C) in which the image (A) is applied (typically printed) onto the article (B).

In step 5 of the present invention, image data (C0) corresponding to the product (C) is acquired from the image data (A3) and the image data (B0). Specifically, in step 5, the image data (C0) as a sample image of a made-to-order product obtained by applying the image (A) to the article (B) is acquired from the image data (A3) and the image data (B0). In a case where a clothing product (C) in which the image (A) is printed on the article (B) is requested, in step 5, the image data (C0) as a sample image of a made-to-order clothing product obtained by printing the image (A) on the article (B) is acquired from the image data (A3) and the image data (B0).

The device 5 that performs step 5 generally has a data conversion unit, an image data (A3) and image data (B0) output unit, an image data (C0) output unit, and a memory. The data conversion unit of the device 5 synthesizes the output image data (A3) and image data (B0) by a predetermined program to generate the image data (C0). An image generated by the image data (C0) can be displayed by transmitting the acquired image data (C0) to a display device separately provided or connected to the image data processing apparatus of the present invention. The image displayed here is used to provide a sample of the product (C) for manufacturing or selling the product (C).

Figure 5:
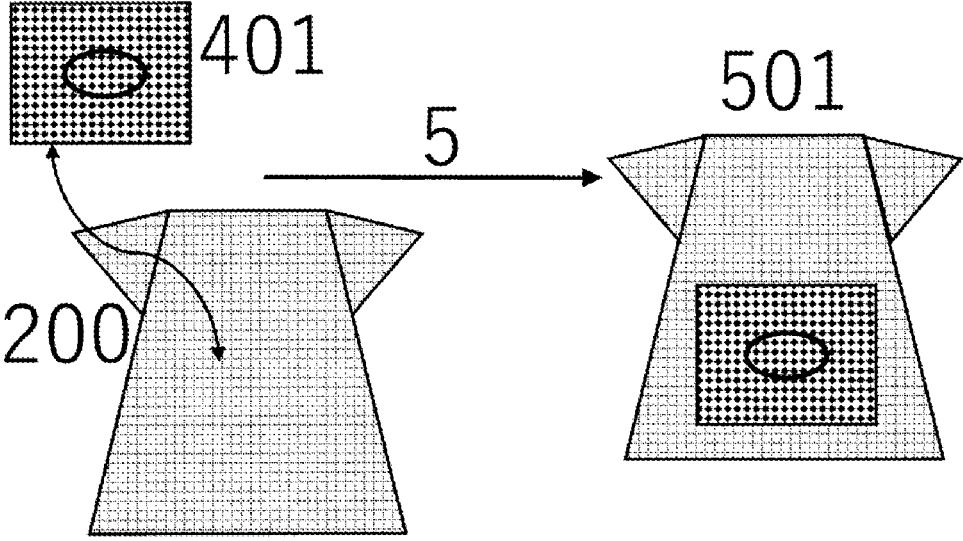
FIG. 5 is an image diagram for visually understanding processing 5 and image data conversion performed by a device 5 of the present invention.

FIG. 5 is an image diagram for understanding step 5 and the device 5. FIG. 5 corresponds to a case where the present invention is used to manufacture and sell a made-to-order shirt (C) obtained by printing an image (A) on an article (B). In step 5 and the device 5, the image data (A3) and the image data (B0) are synthesized to acquire the image data (C0) as a sample image. An image (501) is generated from the image data (C0). The image (501) is treated as a sample image of the made-to-order shirt (C).

[Commercial Use of Product (C)]

The image data processing method and the image data processing apparatus of the present invention are used when the product (C) in which the image (A) is applied to the article (B) is commercially used.

Such use includes general commercial activities such as manufacturing, selling, advertisement, and display of the product (C). For example, when manufacturing the product (C), a manufacturer or manufacturing manager can predict performance of the product (C) before actual manufacturing by using the image data conversion method and the image data conversion apparatus of the present invention. Such prediction is advantageous for efficient quality management. In addition, for example, by using the image data conversion method and the image data conversion apparatus of the present invention, it is possible to provide the consumer with the expected performance of the product (C) as a sample image before making an order or actual manufacturing. Such a sample image is also used for advertisement and display for unspecified or a large number of prospective consumers and prospective traders.

[Effect]

Figure 6:
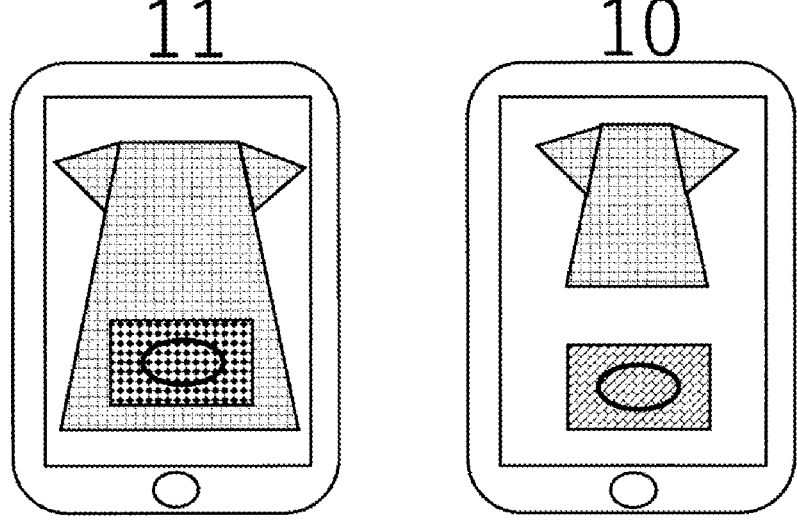
FIG. 6 schematically shows a display example of a sales site of a made-to-order T-shirt (C) obtained by printing an image (A) on an article (B). A left side (11) is an example using the present invention. A right side (10) is an example that does not use the present invention.

FIG. 6 is an image diagram for understanding that the image (501) is effective as a sample image. FIG. 6 shows a display of a made-to-order T-shirt sales site obtained by printing the image (A) on the article (B). In a case (10) where the image data processing method and the image data processing apparatus of the present invention are not used, the customer looks at the image (A) and an image (B0) of the article (B), imagines a finished shirt, and makes an order. It is difficult to accurately predict texture and a color tone of an actual shirt just by looking at the image (A) and the image (B0). On the other hand, in a case (11) where a sample image of a made-to-order T-shirt is displayed using the image data processing method and the image data processing apparatus of the present invention, the texture and the color tone of the finished T-shirt are relatively accurately predicted. By providing such a sample image, it is possible to improve the customer's purchasing desire and a level of satisfaction with the product.

EXAMPLES

Example of Application to Made-To-Order T-Shirt

Figure 7:
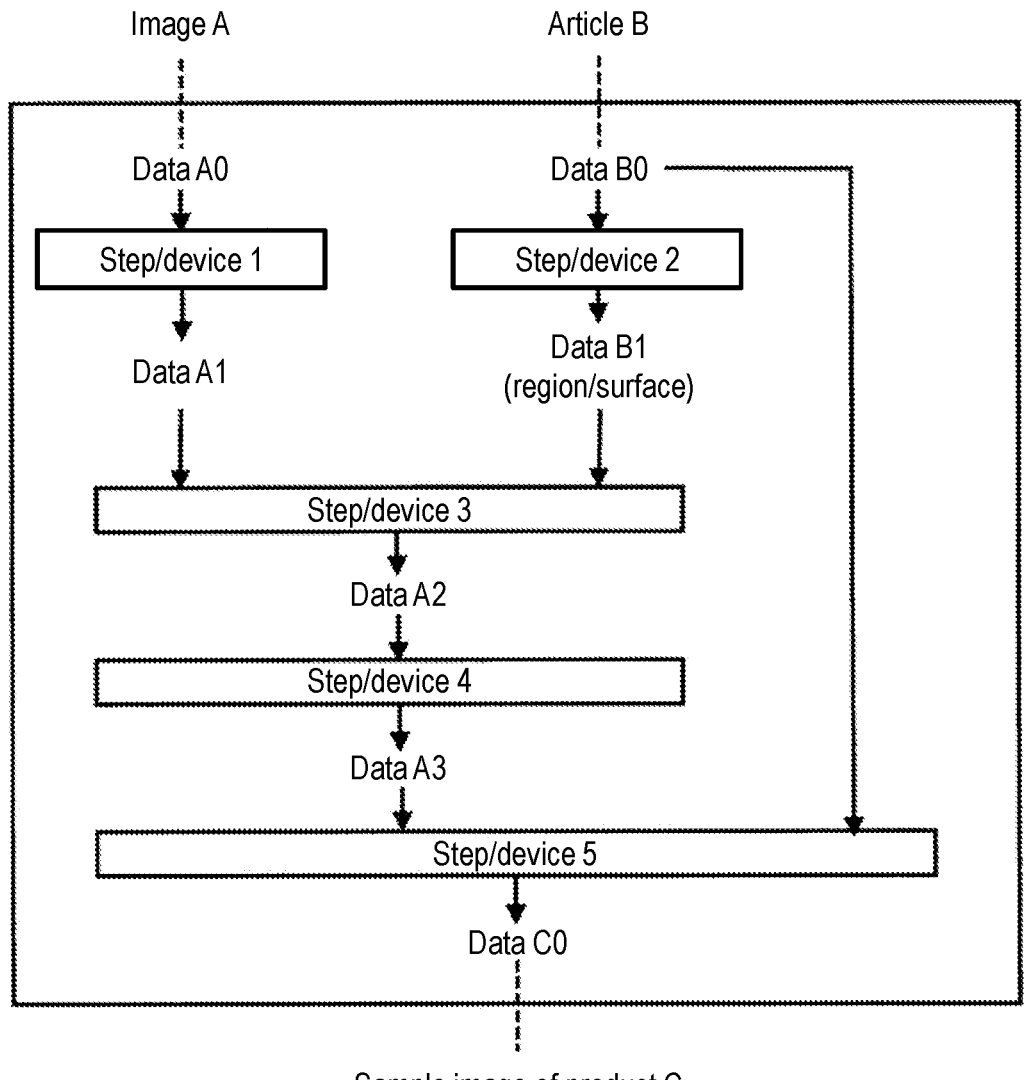
FIG. 7 schematically shows image data processing and a processing flow of an image data processing apparatus of the present invention.

FIG. 7 schematically shows the image data processing and a processing flow of the image data processing apparatus of the present invention. Steps 1 to 5 shown in FIG. 7 were performed to manufacture and sell made-to-order T-shirts on which a color landscape photograph was printed.

Figure 8:
FIG. 8 is an example of an image generated by "data B1" shown in FIG. 7.

FIG. 8 is an image generated by "data B1" acquired in step 2 and the device 2 shown in FIG. 7. In this image, a color tone of an original T-shirt has been changed to black and white/gray generated by grayscale data.

Figure 9:
FIG. 9 is an example of an image generated by "data A3" shown in FIG. 7. However, due to a format of the drawings, an actual color image is displayed in black and white.

FIG. 9 is an image generated by "data A3" shown in FIG. 7. However, in the specification, an actual color image is displayed in a black and white mode. This image reproduces a state in which a color landscape photograph is printed on a finished T-shirt. This image also expresses shadows caused by wrinkles and curves of the T-shirt. A sample image of a made-to-order T-shirt is displayed using "data C0" obtained by synthesizing this image with a T-shirt image. The sample image allows a customer or manufacturer to almost accurately predict a printed portion of the finished T-shirt.

INDUSTRIAL APPLICABILITY

According to the present invention, it is possible to obtain an image that accurately reproduces an actual product. The image data processing method of the present invention, the image data processing apparatus, and the manufacturing and selling of a product using them can improve a purchasing desire and satisfaction of customers who use a manufacturing technology controlled by Internet communication and online shopping. The present invention is useful as a manufacturing technology controlled by Internet communication and a quality improvement technology in online shopping.

The invention claimed is:

1. An image data processing method for performing the following steps 1 to 5 for handling a product (C) in which a specific image (A) is applied to a specific article (B), the method comprising:

(step 1) a step of converting image data (A0) corresponding to the image (A) to generate image data (A1);

(step 2) a step of converting image data (B0) corresponding to the article (B) to grayscale image data and performing blurring on the image data (B0) to generate image data (B1) corresponding to a surface state of a region of the article (B) on which the image (A) is printed;

(step 3) a step of generating image data (A2) by synthesizing the image data (A1) and the image data (B1);

(step 4) a step of converting the image data (A2) to generate image data (A3); and (step 5) a step of generating image data (C0) corresponding to the product (C) by synthesizing the image data (A3) and the image data (B0).

2. The image data processing method according to claim 1, wherein, in the step 1, a value corresponding to one or more of hue, brightness, chroma, transparency, and sharpness of the image data (A0) corresponding to the image (A) is converted to generate the image data (A1).

3. The image data processing method according to claim 1, wherein, in the step 1, a value corresponding to one or more of brightness, chroma, and transparency of the image data (A0) corresponding to the image (A) is converted so as to reduce one or more of the brightness, the chroma, and the transparency, thereby generating the image data (A1).

4. The image data processing method according to claim 1, wherein, in the step 2, the image data (B0) corresponding to the article (B) is converted to generate the image data (B1) corresponding to unevenness and/or texture of a region of the article (B) to which the image (A) is applied.

5. The image data processing method according to claim 1, wherein the article (B) is clothing, and in the step 2, color image data included in the image data (B0) corresponding to the article (B) is converted into the grayscale image data and/or the image data (B0) is subjected to blurring to generate the image data (B1) corresponding to unevenness and/or texture of the region of the article (B) on which the image (A) is printed.

6. The image data processing method according to claim 1, wherein, in the step 3, the image data (A2) that reflects both the image (A) and a surface state of a region of the article (B) to which the image (A) is applied is generated from the image data (A1) and the image data (B1).

7. The image data processing method according to claim 1, wherein, in the step 3, the image data (A2) that reflects both the image (A) and the region of the article (B) on which the image (A) is printed is generated from the image data (A1) and the image data (B1).

8. The image data processing method according to claim 1, wherein, in the step 4, a value corresponding to one or more of hue, brightness, chroma, transparency, and sharpness of the image data (A2) is converted to generate the image data (A3).

9. The image data processing method according to claim 1, wherein, in the step 4, a value corresponding to one or more of hue, brightness, chroma, transparency, and sharpness of the image data (A2) is converted so as to increase one or more of the brightness, the chroma, the transparency, and the sharpness, thereby generating the image data (A3).

10. The image data processing method according to claim 1, wherein, in the step 5, the image data (C0) as a sample image of a made-to-order product obtained by applying the image (A) to the article (B) is generated from the image data (A3) and the image data (B0).

11. The image data processing method according to claim 1, wherein the article (B) is clothing, and in the step 5, the image data (C0) as a sample image of made-to-order clothing obtained by printing the image (A) on the article (B) is generated from the image data (A3) and the image data (B0).

12. An image data processing apparatus having the following devices 1 to 5 for handling a product (C) in which a specific image (A) is applied to a specific article (B), the apparatus comprising:

(device 1) a device converting image data (A0) corresponding to the image (A) to generate image data (A1);

(device 2) a device converting image data (B0) corresponding to the article (B) to grayscale image data and performing blurring on the image data (B0) to generate image data (B1) corresponding to a surface state of a region of the article (B) on which the image (A) is printed;

(device 3) a device generating image data (A2) by synthesizing the image data (A1) and the image data (B1);

(device 4) a device converting the image data (A2) to generate image data (A3); and (device 5) a device generating image data (C0) corresponding to the product (C) by synthesizing the image data (A3) and the image data (B0).

13. The image data processing apparatus according to claim 12, wherein the device 1 converts a value corresponding to one or more of hue, brightness, chroma, transparency, and sharpness of the image data (A0) corresponding to the image (A) to generate the image data (A1).

14. The image data processing apparatus according to claim 12, wherein the device 1 converts a value corresponding to one or more of brightness, chroma, and transparency of the image data (A0) corresponding to the image (A) so as to reduce one or more of the brightness, the chroma, and the transparency, thereby generating the image data (A1).

15. The image data processing apparatus according to claim 12, wherein the device 2 converts the image data (B0) corresponding to the article (B) to generate the image data (B1) corresponding to unevenness and/or texture of a region of the article (B) to which the image (A) is applied.

16. The image data processing apparatus according to claim 12, wherein the article (B) is clothing, and the device 2 converts color image data included in the image data (B0) corresponding to the article (B) into the grayscale image data and/or performs blurring on the image data (B0) to generate the image data (B1) corresponding to unevenness and/or texture of the region of the article (B) on which the image (A) is printed.

17. The image data processing apparatus according to claim 12, wherein the device 3 generates the image data (A2) that reflects both the image (A) and a surface state of a region of the article (B) to which the image (A) is applied, from the image data (A1) and the image data (B1).

18. The image data processing apparatus according to claim 12, wherein the device 3 generates the image data (A2) that reflects both the image (A) and the region of the article (B) on which the image (A) is printed, from the image data (A1) and the image data (B1).

19. The image data processing apparatus according to claim 12, wherein the device 4 converts a value corresponding to one or more of hue, brightness, chroma, transparency, and sharpness of the image data (A2) to generate the image data (A3).

20. The image data processing apparatus according to claim 12, wherein the device 4 converts a value corresponding to one or more of hue, brightness, chroma, transparency, and sharpness of the image data (A2) so as to increase one or more of the brightness, the chroma, the transparency, and the sharpness, thereby generating the image data (A3).

21. The image data processing apparatus according to claim 12, wherein the device 5 generates the image data (C0) as a sample image of a made-to-order product obtained by applying the image (A) to the article (B), from the image data (A3) and the image data (B0).

22. The image data processing apparatus according to claim 12, wherein the article (B) is clothing, and the device 5 generates the image data (C0) as a sample image of made-to-order clothing obtained by printing the image (A) on the article (B), from the image data (A3) and the image data (B0).

\* \* \* \* \*